United States Patent [19]

Katahira et al.

[11] Patent Number: 5,226,708
[45] Date of Patent: Jul. 13, 1993

[54] LIGHTING DEVICE FOR USE WITH VIDEO CAMERA

[75] Inventors: Yukio Katahira, Kawasaki; Ryuichirou Aoyama, Tokyo, both of Japan

[73] Assignee: Tocad Co., Ltd., Tokyo, Japan

[21] Appl. No.: 882,582

[22] Filed: May 13, 1992

Related U.S. Application Data

[62] Division of Ser. No. 740,296, Aug. 5, 1991, abandoned.

Foreign Application Priority Data

Aug. 31, 1990 [JP] Japan ................... 2-228358

[51] Int. Cl.$^5$ .............................................. G03B 15/02
[52] U.S. Cl. .................................. 362/9; 362/194; 362/226; 354/126
[58] Field of Search .............. 362/3, 8, 9, 10, 18, 362/194, 226, 4, 11; 354/126, 135, 149.11; 358/909

[56] References Cited

U.S. PATENT DOCUMENTS 4,924,246  5/1990  Yamada .................. 362/11 X
5,095,408  3/1992  Chen ........................ 362/9

Primary Examiner—Stephen F. Husar
Attorney, Agent, or Firm—Spensley Horn Jubas & Lubitz

[57] ABSTRACT

Here is disclosed a lighting device for use with a video camera provided with a detachable battery casing. According to this invention, the lighting device includes a leg thinly configured in unison with a light emitter, wherein said leg is attached along one side thereof to a mount arranged on a rear side of the video camera and adapted to serve also as the mount for the battery casing, the battery casing is attached to the other side of the leg and thereby a battery contained within the battery casing energizes both the lighting device and the video camera. According to another aspect of the invention, the battery casing is provided with means adapted to be loaded thereon with the lighting device and, upon loading this means with the lighting device, the latter is electrically connected to the battery contained within the battery casing through electric connector means.

4 Claims, 3 Drawing Sheets

LIGHTING DEVICE FOR USE WITH VIDEO CAMERA

This is a division of application Ser. No. 07/740,296 filed on Aug. 5, 1991, now abandoned.

BACKGROUND OF THE INVENTION

1. Field of the Invention

The present invention relates to a lighting device for use with a video camera to light up a scene to be shot by the video camera.

2. Background Art

The most commonly used lighting device of such purpose is adapted to be mounted on a bracket or the like which is, in turn, attached to the video camera by means of a tripod screw, and contains therein a battery for energization of the lighting device. Such arrangement is based on the fact that it has become difficult for the video camera to have a built-in amount exclusively for the lighting device as the video camera has recently been made more and more compact.

In addition, such compactness of the video camera has made it impossible for the video camera to contain a battery of adequately large capacity therein and, in consequence, there is a predominant tendency such that a battery casing which contains therein a battery is detachably attached to the video camera.

Thus, the lighting device of prior art requires the above-mentioned additional means such as the bracket to mount this on the video camera and encounters serious inconvenience during shooting due to bulky configuration as well as heavy weight of the lighting device resulting from its construction adapted to contain the battery therein.

SUMMARY OF THE INVENTION

It is a principal object of the present invention to solve the problems as have been mentioned above.

The object as set forth above is achieved, according to one aspect of the present invention, by a lighting device for use with a video camera having a battery casing attached thereto by lockable attachment means, wherein said lighting device includes a leg formed in unison therewith, said leg being attached along one side thereof to said video camera on a battery casing loading means of said video camera, and said battery casing being attached to the other side of said leg so that a battery contained within said battery casing can energize both said video camera and said lighting device.

The object as set forth above is also achieved, according to another aspect of the present invention, by a lighting device for use with a video camera provided with a detachable battery casing, wherein the battery casing is provided with means to be loaded thereon with said lighting device, said loading means including an electric connector, and said lighting device is provided with an electric connector adapted to be electrically connected to said connector on the side of said loading means when said lighting device is loaded on said loading means.

The lighting device constructed according to the teachings of the present invention can be readily attached even to a compact video camera and utilize the battery contained within the battery casing in common with the video camera. In this manner, there is provided a lighting device which is effectively weight-reduced and therefore convenient for use.

BRIEF DESCRIPTION OF THE DRAWING

FIG. 1 and FIGS. 2(a) through 2(c) illustrate an embodiment of the present invention, in which:

FIG. 1 is a side view of a video camera, showing, in a section, a lighting device attached to the video camera; and FIGS. 2(a) through 2(c) are perspective views illustrating the video camera, the lighting device and a battery casing, respectively, as disconnected one from another; and FIG. 3 and FIGS. 4(a) through (c) illustrate another embodiment of the present invention, in which:

FIG. 3 is a view similar to FIG. 1; and

FIGS. 4(a) through 4(c) are side views illustrating the video camera, the lighting device and the battery casing, respectively.

DESCRIPTION OF THE PREFERRED EMBODIMENTS:

The invention will be described by way of example in reference with the accompanying drawing.

Figure 1:
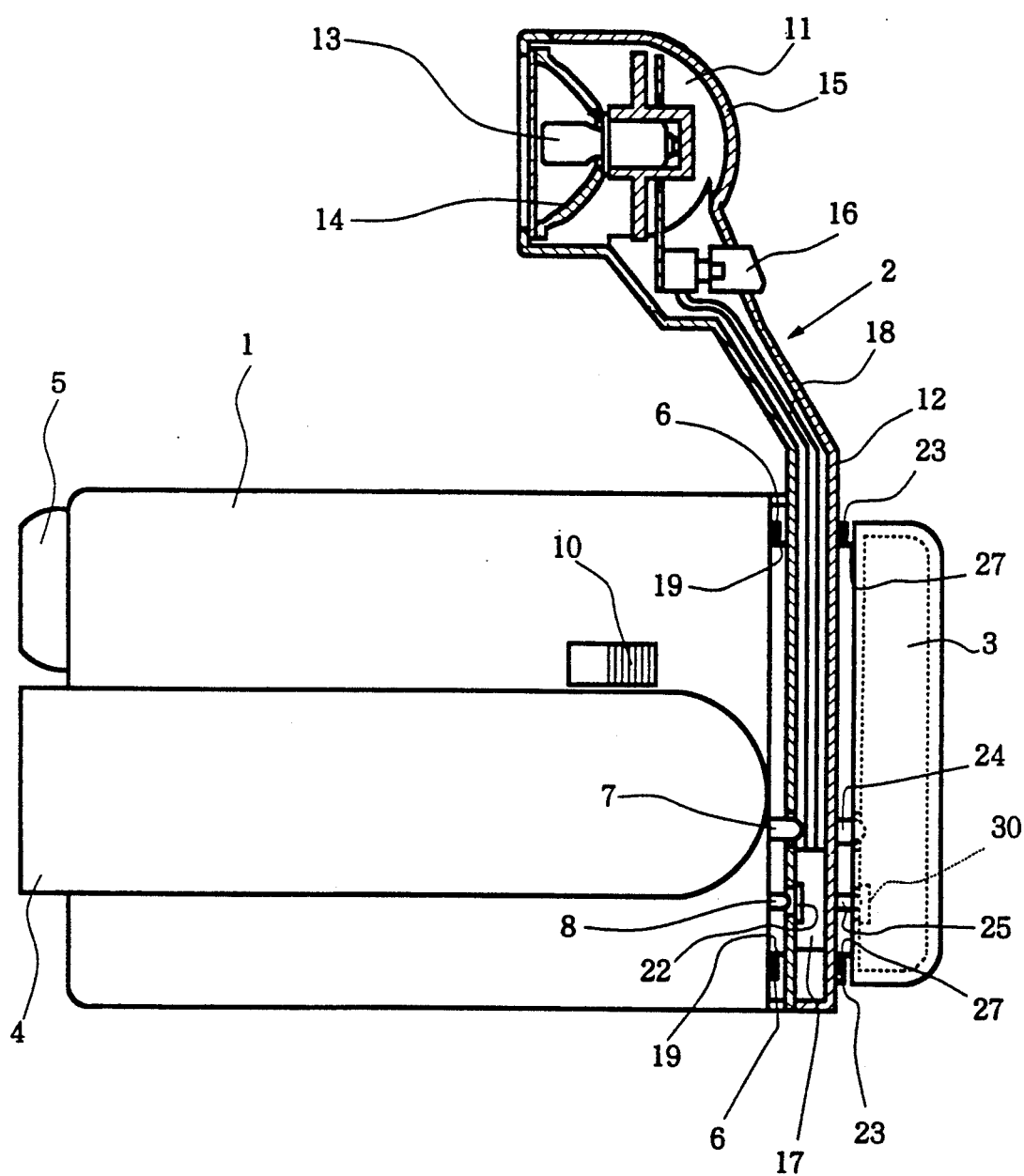

FIG. 1 is a side view of a video camera 1, showing, in a section, a lighting device 2 attached to the video camera 1.

FIGS. 2(a) through 2(c) are perspective views illustrating the video camera 1, the lighting device 2 and a battery casing 3, respectively.

Referring to these figures, reference numerals 4 and 5 designate a lens barrel and a sound collecting microphone, respectively, of the video camera 1.

Figure 2:
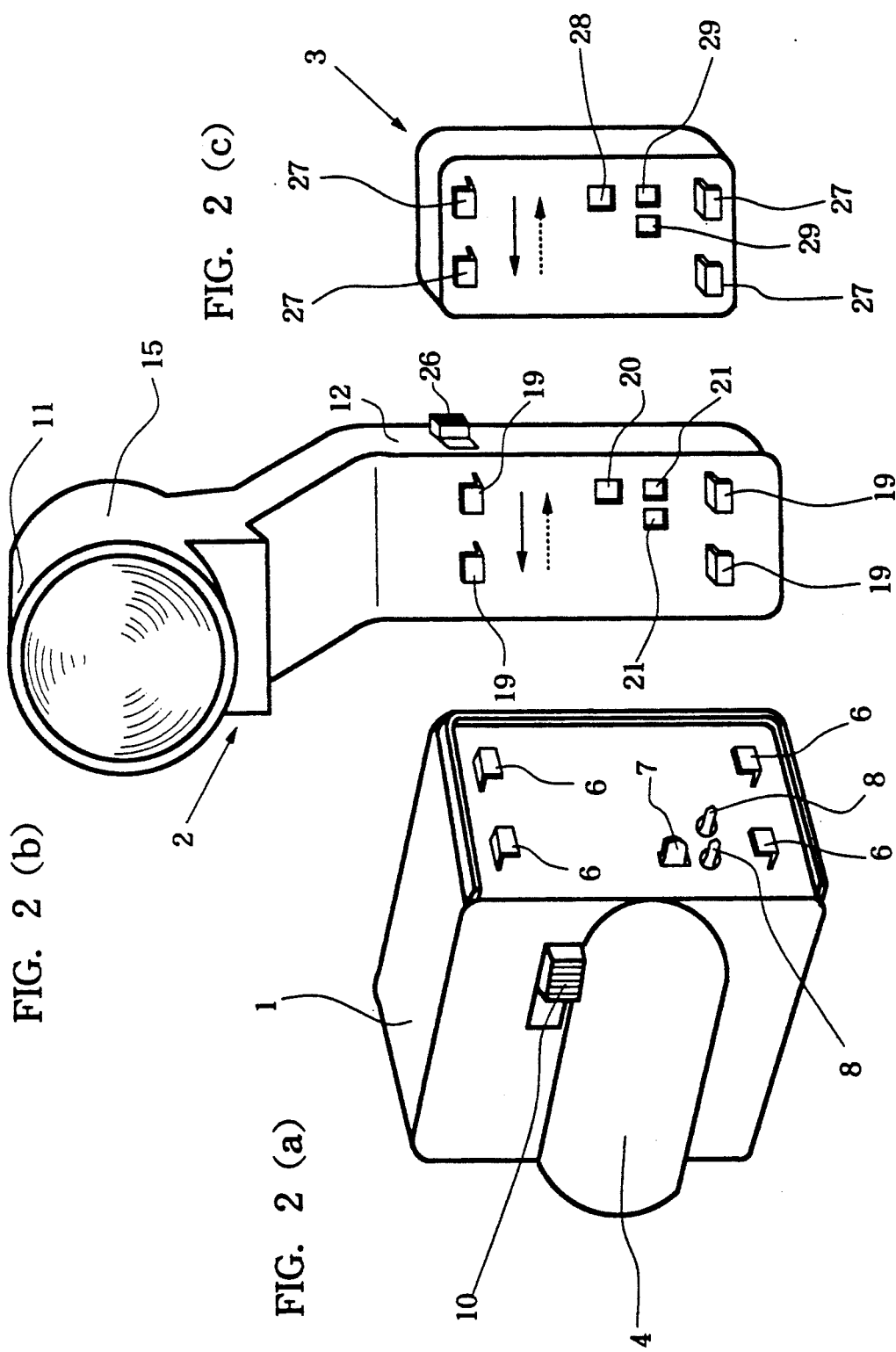
Figure 3:
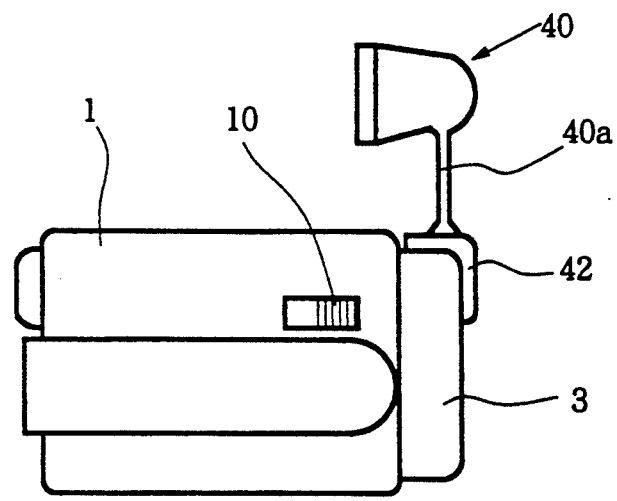
Figure 4:
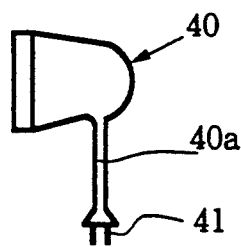
Figure 4:
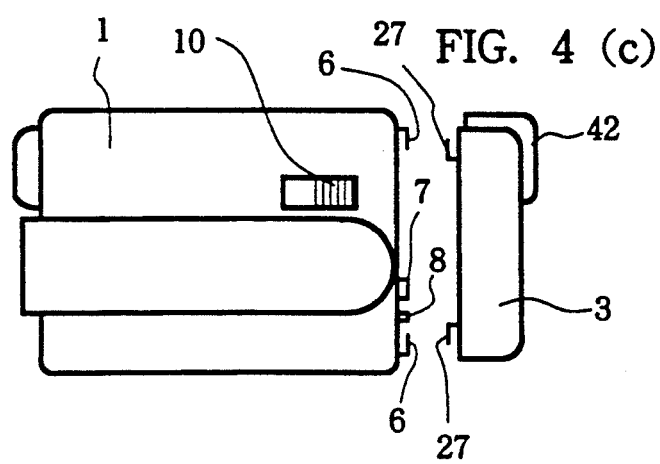

On a rear side of the video camera 1, as shown by FIG. 2, two pairs of anchoring pawls 6 are vertically spaced from each other and, in addition, there are provided a locking piece 7 and a pair of electric terminals 8. Both the locking piece 7 and the electric terminals 8 are normally biased to project forward.

Said lens barrel 4 provided on one lateral side of the video camera 1 has on its top a release button 10 which may be slidably moved to retract the locking piece 7 into the video camera 1 and may be set free to project said locking piece 7 forward again.

The lighting device 2 comprises a light emitter 11 and a leg 12 of a given length formed in unison with said light emitter 11.

The light emitter 11 is of the well known construction, i.e., comprising a casing 15 containing therein various components such as a halogen lamp 13 and a reflector 14, and adapted to be put on and off by operating a push-button switch 16.

The leg 12 has a thin configuration and contains therein various components such as an electric connector 17 disposed at the bottom and electric cord 18 extending from said connector 17 to said push-button switch 16.

The leg 12 is further provided with two pairs of anchoring pawls 19 projecting from a front side thereof so as to be engageable with the respective pairs of said anchoring pawls 6 projecting from the rear side of the video camera 1. The leg 12 is further formed through the front side thereof with a locking hole 20 adapted to receive the locking piece 7 and a pair of holes 21 adapted to receive the pair of electric terminals 8. Said holes 21 contain therein respective metallic plates 22 with which the respective electric terminals 8 are brought into contact.

The leg 12 is formed on its rear side with two pairs of anchoring pawls 23, a locking piece 24 and a pair of electric terminals 25, all of which project forward in the same manner as those formed on the rear side of the video camera 1.

The leg 12 has on one lateral side a release button 26 which may be slidably moved to retract the locking piece 24 into the leg 12 and may be set free to project said locking piece 24 forward again just in the same manner as the release button 10 provided on the video camera 1.

The battery casing 3 is loaded therein with the battery and its front side is constructed similarly to the front side of the lighting device's leg 12. Specifically, there are provided with two pairs of anchoring pawls 27, a locking hole 28 and a pair of terminal receiving holes 29 containing therein respective metallic plates 30.

Before the lighting device 2 is attached to the video camera 1, the battery casing 3 must be removed from the video camera 1 since, when the lighting device 2 is not used, shooting occurs with the battery casing 3 directly attached to the video camera 1.

Then, the lighting device 2 is positioned with the front side of its leg 12 being opposed to the rear side of the video camera 1 and laterally moved in the direction as indicated by a solid line arrow in FIG. 2(b) so that, during this movement, said locking piece 7 and said pair of electric terminals 8 may be maintained depressed by a part of said leg's front side. The locking piece 7 and the electric terminals 8 are maintained forcibly retracted by said part of the lighting device 2 into the video camera 1 until the lighting device 2 reaches a predetermined position, whereupon said locking piece 7 and said electric terminals 8 project forward again into the locking hole 20 and the terminal receiving holes 21, respectively, under the biasing effect.

In this state, the anchoring pawls 6 on the video camera 1 are engaged with the associated anchoring pawls 19 on the lighting device 2 and thereby the lighting device 2 is reliably attached to the video camera 1.

At the same time, the pair of electric terminals 8 are brought into contact with the associated metallic plates 22 within the respective terminal receiving holes 21 and thereby an electric connection is established between the video camera 1 and the connector 17 of the lighting device 2.

Now, the battery casing 3 is attached to the rear side of the lighting device's leg 12.

In the same manner as that in which the lighting device 2 has been attached to the video camera 1, the battery casing 3 is positioned with its front side being opposed to the rear side of the lighting device's leg 12 and laterally moved in the direction as indicated by a solid line arrow in FIG. 2(c) so that, during this movement, the locking piece 24 and the pair of electric terminals 25 may be maintained depressed by a part of the battery casing's front side. The battery casing 3 is attached to the lighting device 2 and thereupon an electric connection is established between the lighting device 2 and the battery contained within the battery casing 3.

In this way, the lighting device 2 is not only mechanically but also electrically connected to the video camera 1, on one side, and to the battery casing 3, on the other side, so that the battery contained within the battery casing 3 is electrically connected to the connector 17 of the lighting device 2. Thus, both the video camera 1 and the lighting device 2 can be energized from the battery through said connector 17.

When it is desired to light up a scene to be shot, the push-button switch 16 may be operated to put the light emitter on.

To detach the lighting device 2, with the release button 10 of the video camera 1 being slided and then held so as to maintain the locking piece 7 out of its locking effect, the lighting device 2 may be moved in the direction as indicated by a broken line arrow in FIG. 2(b) to detach the lighting device 2 together with the battery casing 3 connected thereto.

Then, with the release button 26 of the lighting device 2 being slided and held so as to maintain the locking piece 24 out of its locking effect, the battery casing 3 may be moved in the direction as indicated by a broken line arrow in FIG. 2(c) to detach the battery casing 3 from the lighting device 2.

Now, the battery casing 3 is attached to the rear side of the video camera 1 in the same manner as that in which the lighting device 2 is attached to the video camera 1.

FIG. 3 and FIGS. 4(a) through 4(c) illustrate another embodiment of the invention.

Referring to these figures, a lighting device 40 has a leg 40a of which the lower end defines a plug type connector 41 and this plug type connector 41 may be inserted into a socket type connector 42 formed in the top of the battery casing 3 to attach the lighting device 40 to the video camera 1.

It should be understood that both the plug type connector 41 and the socket type connector 42 may be of well known art such as the hot shoe structure, which is a structure in which connectors 41 and 42 have electrical terminals which mate so as to be in direct contact with one another when lighting device 40 is attached to battery casing 3.

While the invention has been described hereinabove with respect to the presently preferred embodiments, the invention is not limited to these specific embodiments and, for example, the battery casing 3 is not limited to that adapted to be loaded therein with the battery and it is also possible to employ battery means which is integral with a casing.

What is claimed is:

1. A lighting device for use with a video camera provided with a detachable battery casing, wherein the battery casing is provided with lighting device loading means including an electric connector, wherein said lighting device is also provided with an electric connector adapted to be electrically connected to said connector on the side of said loading means when said lighting device is loaded on said loading means, and wherein the lighting device is loaded on the battery casing by attachment means of hot shoe type.

2. A lighting device for use with a video camera as recited in claim (1), wherein the battery casing is provided with a socket type connector and the lighting device is provided with a plug type connector.

3. A lighting device for use with a video camera as recited in claim (1), wherein the battery casing has a battery which is removably contained therein.

4. A lighting device for use with a video camera as recited in claim (1), wherein the battery casing has a battery which is arranged integrally with the casing.

* * * * *